(12) United States Patent
Lam

(10) Patent No.: US 12,736,108 B2
(45) Date of Patent: Sep. 15, 2026

(54) CABLE WIRE CONNECTOR

(71) Applicant: NEWTECHWOOD CORPORATION, Huizhou (CN)

(72) Inventor: Terry Yung Lam, Huizhou (CN)

(73) Assignee: NEWTECHWOOD CORPORATION, Huizhou (CN)

(*) Notice: Subject to any disclaimer, the term of this patent is extended or adjusted under 35 U.S.C. 154(b) by 284 days.

(21) Appl. No.: 18/431,949

(22) Filed: Feb. 3, 2024

(65) Prior Publication Data

US 2024/0410445 A1 Dec. 12, 2024

(30) Foreign Application Priority Data

Jun. 12, 2023 (CN) ......................... 202321484058.9

(51) Int. Cl.
*F16G 11/12* (2006.01)
*E01D 19/16* (2006.01)

(52) U.S. Cl.
CPC .............. *F16G 11/12* (2013.01); *E01D 19/16* (2013.01)

(58) Field of Classification Search
CPC ......... F16G 11/12; E01D 19/16; E04H 17/02; E04H 17/10; E04H 17/12; E04H 17/124; E04H 17/127; E04F 11/1859; E04F 2011/1882; E01F 15/06
See application file for complete search history.

(56) References Cited

U.S. PATENT DOCUMENTS 1,694,683 A * 12/1928 Cole ..................... F16G 11/048 403/275
4,190,234 A * 2/1980 Coleman ............... E04H 17/127 254/232
7,198,253 B2 * 4/2007 Striebel ............... E04F 11/1834 403/275
9,133,635 B2 * 9/2015 Titcomb .............. E04G 17/0658
9,194,155 B2 * 11/2015 Landry ............... E04G 21/3219
9,249,577 B2 * 2/2016 Ross ....................... F16G 11/04
10,436,231 B2 * 10/2019 White ................... F16G 11/025
10,738,422 B2 * 8/2020 Annan .................... E01D 19/14
10,947,754 B2 * 3/2021 Sorkin .................. F16G 11/048
(Continued)

FOREIGN PATENT DOCUMENTS

GB 2529964 A * 3/2016 ............ E04H 17/10
KR 20040062490 A * 7/2004
(Continued)

*Primary Examiner* — Jonathan P Masinick
(74) *Attorney, Agent, or Firm* — Cooper Legal Group, LLC

(57) ABSTRACT

Disclosed is a cable wire connector, comprising: a cable wire, a cable grip fixed to an end of the cable wire, a mounting member sheathed on the cable wire and abutted against the cable grip, and two adjusting members adjustably arranged at both ends of the mounting member along an axial direction of the cable wire; wherein the first adjusting member is sheathed on the cable wire and is located on a side of the mounting member away from the cable grip; wherein the second adjusting member is located on a side of the mounting member abutting against the cable grip, and cavity for accommodating the cable grip is formed between the second adjusting member and the mounting member; and wherein the second adjusting member can be fixed at a position where the cable wire is to be fixed. The present application aims to provide a cable wire connector.

4 Claims, 2 Drawing Sheets

(56) References Cited

U.S. PATENT DOCUMENTS

| | | | | |
|---|---|---|---|---|
| 10,975,591 | B2 * | 4/2021 | Kennedy | E04F 11/1859 |
| 11,156,265 | B2 * | 10/2021 | Mergens | F16G 11/04 |
| 11,668,096 | B2 * | 6/2023 | Li | E04F 11/1859<br>256/21 |
| 11,732,482 | B2 * | 8/2023 | Burt | E04F 11/1859<br>256/59 |
| 2006/0201083 | A1 * | 9/2006 | Hayes | E04G 21/12<br>52/223.13 |
| 2018/0094436 | A1 * | 4/2018 | Sorkin | E04B 1/4114 |
| 2024/0368913 | A1 * | 11/2024 | Miller | E04H 17/124 |
| 2024/0368914 | A1 * | 11/2024 | Storrer | E04H 17/127 |

FOREIGN PATENT DOCUMENTS

| | | | | |
|---|---|---|---|---|
| KR | 20110120535 | A * | 11/2011 | E04H 17/08 |
| WO | WO-2015089513 | A1 * | 6/2015 | F16G 11/12 |
| WO | WO-2019100225 | A1 * | 5/2019 | F16G 11/12 |

* cited by examiner

CABLE WIRE CONNECTOR

CROSS-REFERENCE TO RELATED APPLICATIONS

The present application claims priority and benefits to Chinese Patent Application No. 202321484058.9, filed to the China Patent Office on Jun. 12, 2023, entitled "CABLE WIRE CONNECTOR", the contents of which are hereby incorporated by reference in its entirety.

TECHNICAL FIELD

The present application relates to the technical field of connectors, in particular, to a cable wire connector.

BACKGROUND ART

Cable wire connectors are fasteners used for connecting cable wires, which can firmly connect the cable wires for use in fields such as construction, bridges, and ships. Cable wire connectors play an important role in ensuring the stability and safety of the cable wires and thus the stability and safety of the entire structure.

The design of the cable connectors is of great importance. The cable connectors must be able to withstand tension and compression forces from the cables. At the same time, the cable wire connectors must have a certain degree of elasticity so that they can buffer a part of external forces exerted on the cable wire, thereby protecting the entire structure.

As for the basic structure of existing cable wire connectors, one end of the cable wire is fixed on a fixed structure such as a post, and the other end is fixed on a screw. The screw constitutes a tension adjustment structure for the cable wire. The distance between the post and the screw can be adjusted by rotating the screw, thereby adjusting the tension of the cable wire. Due to its large size, the screw will be generally exposed outside the post. For a cable wire handrail with high aesthetic requirements, the cable wire tension adjustment structure exposed outside the post affects the aesthetics of the handrail.

SUMMARY OF THE INVENTION

The present application aims to provide a cable wire connector. The technical solution provided by this application is used to solve the current technical problem that the cable wire tension adjustment structure exposed outside the post affects the overall aesthetics.

In order to solve the above technical problem, the present application provides a cable wire connector, which includes: a cable wire, a cable grip fixed to an end of the cable wire, a mounting member sheathed on the cable wire and abutted against the cable grip, and two adjusting members adjustably arranged at both ends of the mounting member along an axial direction of the cable wire;

- wherein the first adjusting member is sheathed on the cable wire and is located on a side of the mounting member away from the cable grip;
- wherein the second adjusting member is located on a side of the mounting member abutting against the cable grip, and cavity for accommodating the cable grip is formed between the second adjusting member and the mounting member; and
- wherein the second adjusting member can be fixed at a position where the cable wire is to be fixed.

In some embodiments, the mounting member is formed with internal or external threads on its peripheral surface; the first adjusting member and the second adjusting member are formed with internal or external threads; the two adjusting members are connected to the mounting member at both ends of the mounting member via the threads.

In some embodiments, an end of the first adjusting member away from the mounting member extends radially to form a first boss.

In some embodiments, an end of the second adjusting member away from the mounting member extends radially to form a second boss.

In some embodiments, the mounting member and/or the first adjusting member is formed with a step-shaped first locking platform on a peripheral surface thereof.

In some embodiments, the second boss of the second adjusting member is formed with a step-shaped second locking platform.

In some embodiments, the mounting member is provided with a blind hole along the axial direction for accommodating the cable grip on an end close to the cable grip.

In some embodiments, the second adjusting member is provided with a fixing structure for fixing another cable wire at an end of the second adjusting member far away from the mounting member.

BRIEF DESCRIPTION OF THE DRAWINGS

In order to explain the technical solutions in the embodiments of the present application or the prior art more clearly, the drawings required to describe the embodiments of the present application or the prior art will be briefly introduced below. It is apparent that the drawings in the following description are only some embodiments of the present invention, and other drawings can be obtained from these drawings without any creative work for those skilled in the art.

DETAILED DESCRIPTION OF THE INVENTION

Multiple embodiments of the present application will be disclosed below in the form of illustrations. For the sake of describing clearly, many practical details will be described together in the following description. However, it is to be understood that these practical details are not intended to limit the present application. That is, in some implementations of the present application, these practical details are unnecessary. In addition, for the sake of simplifying the schemata, some commonly used structures and components will be depicted in a simple schematic manner in the schemata.

It is to be noted that all directional indications such as upper, lower, left, right, front, and rear in the embodiments of the present application are merely used for explaining relative positional relationships, movement situations, and the like among various parts under a specific attitude, as shown in the accompanying drawings. If the specific attitude changes, the directional indication will change accordingly.

In addition, the descriptions "first", "second", and the like in the present application are merely used for a purpose of description and do not specifically refer to or order or a rank, nor intended to limit the present application. They are merely intended to distinguish components or operations described in the same technical terms, and cannot be understood as indicating or implying their relative importance or implying the quantity of indicated technical features. Therefore, a feature defined by "first" and "second" may explicitly or implicitly include at least one of the features. In addition, the technical solutions among various embodiments may be combined with one another, but must be based on the realization of those of ordinary skill in the art. When the combination of the technical solutions is contradictory or cannot be realized, it shall be considered that the combination of the technical solutions does not exist and does not fall within the scope of protection required by the present application.

In order to further understand the content, characteristics, and effects of the present application, the following embodiments are cited and explained below in detail with the accompanying drawings.

The existing cable wire connector completes connection and tension adjustment by using a screw. Due to its large size, the screw will be generally exposed outside the post. For a cable wire handrail with high aesthetic requirements, the cable wire tension adjustment structure exposed outside the post affects the aesthetics of the handrail.

Figure 1:
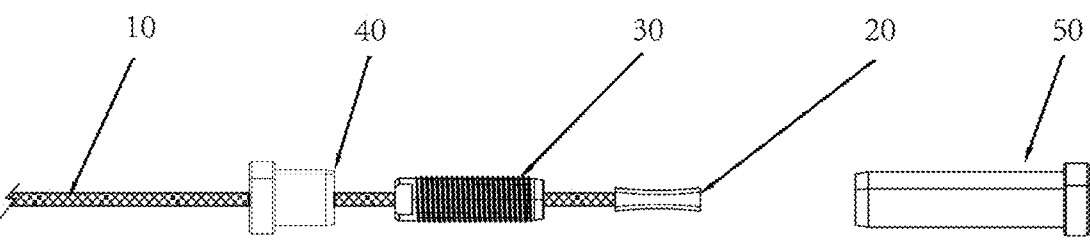
FIG. 1 is a schematic diagram of a cable wire connector in a disassembled state according to an embodiment of the present application.
Figure 2:
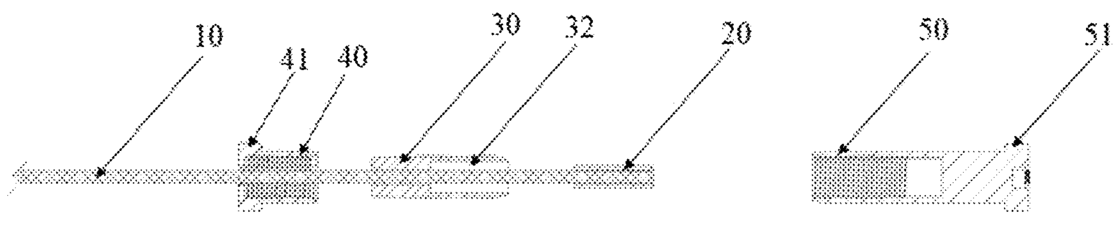
FIG. 2 is a sectional view of a cable wire connector in a disassembled state according to an embodiment of the present application.

Referring to FIG. 1 to FIG. 2, in order to solve the above technical problems, the present embodiment provides a cable wire connector, including a cable wire 10, a cable grip 20, a mounting member 30, and two adjusting members.

Whereas the cable grip 20 is a straight body component and is fixed to an end of the cable wire 10. The mounting member 30 is sheathed on the cable wire 10, and abuts against the cable grip 20. The two adjusting members are adjustably arranged at both ends of the mounting member 30 along the axial direction of the cable wire 10.

Specifically, the two adjusting members are a first adjusting member 40 and the second adjusting member 50 respectively. Whereas the first adjusting member 40 is sheathed on the cable wire 10 and is located on a side of the mounting member 30 away from the cable grip 20. The second adjusting member 50 is located on a side of the mounting member 30 abutting against the cable grip 20. A cavity for accommodating the cable grip 20 is formed between the second adjusting member 50 and the mounting member 30. The second adjusting member 50 can be fixed at a position where the cable wire 10 is to be fixed.

Based on the above structural features, both the first adjusting member 40 and the mounting member 30 are sheathed on the cable wire 10, and the cable grip 20 abuts against the mounting member 30. Therefore, in an assembling process, the cable wire 10 needs to travel through the first adjusting member 40 and then the mounting member 30. After the cable wire 10 traveling through the mounting member 30, the cable grip 20 is fixed to an end of the cable wire 10 by using a pressing device. Therefore, the first adjusting member 40 and the mounting member 30 are sheathed on the cable wire 10 without detaching from the cable wire 10.

After the above operations, the first adjusting member 40 and the second adjusting member 50 are adjustably arranged at both ends of the mounting member 30 along the axial direction of the cable wire 10. In the present embodiment, adjustment may be accomplished via threads. Specifically, the mounting member 30 is formed with internal or external threads on its peripheral surface, and the first adjusting member 40 and the second adjusting member 50 are formed with internal or external threads corresponding to the threads on the mounting member 30. The two adjusting members are connected to the mounting member 30 at both ends of the mounting member 30 via the threads.

For a cable wire handrail with high aesthetic requirements, the cable wire tension adjustment structure exposed outside the post affects the aesthetics of the handrail. Therefore, the cable wire connector provided by the present embodiment can be completely buried at a position where the cable wire is to be fixed, that is, in a post of the handrail. To this end, in the present embodiment, an end of the second adjusting member 50 away from the mounting member 30 extends radially to form a second boss 51.

Figure 3:
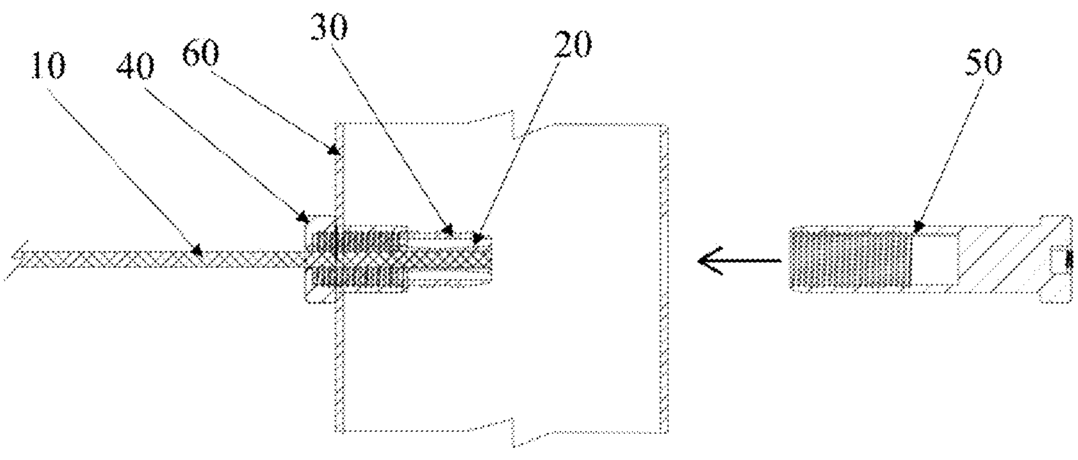
FIG. 3 is a sectional view of a cable wire connector and a post in an engaged state according to an embodiment of the present application.

As shown in FIG. 3, according to the thickness of the post 60, the first adjusting member 40 and the mounting member 30 are connected properly via threads. The degree of tightness of the cable wire 10 is adjusted. After the cable wire 10 is assembled, the cable wire 10 can be inserted into a mounting hole formed in the post 60 from left to right. Then the second adjusting member 50 is assembled in the mounting hole from right to left and is connected to a right end of the mounting member 30 via threads, until the second adjusting member 50 is fixed firmly, and then the assembly and tension adjustment of the cable wire 10 are completed.

For the aesthetics of the post 60, an end of the first adjusting member 40 away from the mounting member 30 may extend radially to form a first boss 41. The first boss 41 is located on the left side of the post 60, and is symmetrically arranged with the second boss 51 on the right side.

Figure 4:
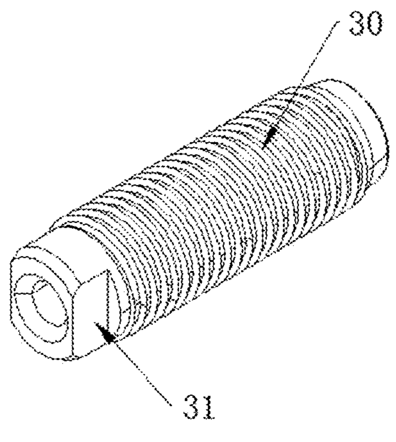
FIG. 4 is a schematic diagram of a mounting member according to an embodiment of the present application.
Figure 5:
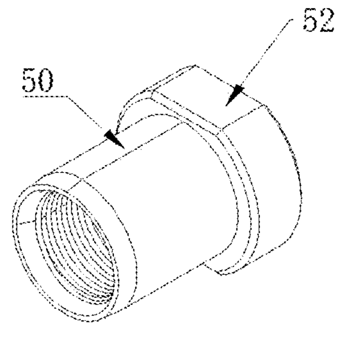
FIG. 5 is a schematic diagram of a second adjusting member according to an embodiment of the present application.

As shown in FIG. 4 to FIG. 5, since the mounting member 30 provided by the present embodiment is connected via threads, to reduce the difficulty in connecting and improve assembly efficiency, in the present embodiment, the mounting member 30 and/or the first adjusting member 40 is formed with a step-shaped first locking platform 31 on the peripheral surface thereof, and the second boss 51 of the second adjusting member 50 is formed with a step-shaped second locking platform 52. Construction workers may, employing tools such as a wrench, complete the threaded connection between the first adjusting member 40 and the mounting member 30 through the first locking platform 31, and complete the threaded connection between the second adjusting member 50 and the mounting member 30 through the second locking platform 52.

In order to further reduce the overall size, in the present embodiment, the mounting member 30 is provided with a blind hole 32 along the axial direction for accommodating the cable grip 20 on an end of the mounting member 30 close to the cable grip 20. The blind hole 32 constitutes the cavity for accommodating the cable grip 20 formed between the second adjusting member 50 and the mounting member 30. The cable grip 20 is embedded into the blind hole 32 of the mounting member 30, which further reduces the length of the overall structure.

The cable wire connector of the above structure is suitable for the connection and fixation between the cable wire 10 and the post 60. The post 60 is only used as a fixing post for a starting end or a tail end of the handrail. For the post located at a middle section of the handrail, the cable wire 10 needs to travel through the post to continue to connect to another post. To realize the connection and fixation among a plurality of posts, the second adjusting member 50 is provided with a fixing structure (not shown in the drawings) for fixing another cable wire 10 at an end far away from the mounting member 30.

In conclusion, the connection and fixation of the cable wires are completed by using four small components in the technical solution provided by the present application. The cable wire connector has a tension adjusting function, and meanwhile, the four small components have small sizes, can be completely buried at a position where the cable wire is to be fixed, are not easily damaged, and make the overall structure simple and light.

The implementations described above do not constitute limitations on the scope of the protection of the technical solution. Any modifications, equivalent replacements, improvements, and the like made within the spirit and principle of the implementations shall fall within the scope of protection of the technical solution.

What is claimed is:

1. A cable wire connector, comprising:

a cable wire;

a cable grip fixed to an end of the cable wire;

a mounting member sheathed on the cable wire and abutted against the cable grip, wherein the mounting member is provided with a blind hole along an axial direction of the cable wire accommodating the cable grip; and two adjusting members adjustably arranged at both ends of the mounting member along the axial direction of the cable wire, wherein the two adjusting members comprises a first adjusting member and a second adjusting member threaded onto the mounting member, an end of the first adjusting member away from the mounting member extends radially to form a first boss, and an end of the second adjusting member away from the mounting member extends radially to form a second boss.

2. The cable wire connector according to claim 1, wherein the mounting member is formed with internal or external threads on a peripheral surface of the mounting member, the first adjusting member and the second adjusting member are formed with internal or external threads, and the two adjusting members are connected to the mounting member at both ends of the mounting member via the internal or external threads of the mounting member and the internal or external threads of the two adjusting members.

3. The cable wire connector according to claim 1, wherein at least one of the mounting member or the first adjusting member is formed with a step-shaped first locking platform on a peripheral surface of the at least one of the mounting member or the first adjusting member.

4. The cable wire connector according to claim 1, wherein the second boss of the second adjusting member is formed with a step-shaped second locking platform.

* * * * *